US012087486B2

(12) United States Patent
Virtanen et al.

(10) Patent No.: US 12,087,486 B2
(45) Date of Patent: Sep. 10, 2024

(54) STATIC ELECTRICAL DEVICE ASSEMBLY COMPRISING HEAT EXCHANGER SYSTEM

(71) Applicant: Hitachi Energy Ltd, Zürich (CH)

(72) Inventors: Esa Virtanen, Vaasa (FI); Heli Ojalammi, Vaasa (FI); Katja Oinas, Vaasa (FI)

(73) Assignee: Hitachi Energy Ltd, Zürich (CH)

( * ) Notice: Subject to any disclaimer, the term of this patent is extended or adjusted under 35 U.S.C. 154(b) by 271 days.

(21) Appl. No.: 17/417,872

(22) PCT Filed: Nov. 22, 2019

(86) PCT No.: PCT/EP2019/082212
§ 371 (c)(1),
(2) Date: Jun. 24, 2021

(87) PCT Pub. No.: WO2020/135950
PCT Pub. Date: Jul. 2, 2020

(65) Prior Publication Data

US 2022/0102048 A1 Mar. 31, 2022

(30) Foreign Application Priority Data

Dec. 27, 2018 (EP) .................................... 18248066

(51) Int. Cl.
*H01F 27/02* (2006.01)
*F28D 21/00* (2006.01)
(Continued)

(52) U.S. Cl.
CPC ....... *H01F 27/025* (2013.01); *F28D 21/0001* (2013.01); *F28F 27/02* (2013.01); *H01F 27/402* (2013.01); *H01F 2027/406* (2013.01)

(58) Field of Classification Search
CPC ................. H01F 27/025; H01F 27/402; H01F 2027/406; F28D 21/0001; F28F 27/02
(Continued)

(56) References Cited

U.S. PATENT DOCUMENTS 2,927,736 A 3/1960 Rohatyn
4,512,387 A 4/1985 Rodriguez et al.
(Continued)

FOREIGN PATENT DOCUMENTS

CN 108847333 A 11/2018
CN 108899163 A 11/2018
(Continued)

OTHER PUBLICATIONS

DE-3221848-C English Translation (Year: 1989).*
(Continued)

*Primary Examiner* — Anatoly Vortman
(74) *Attorney, Agent, or Firm* — Sage Patent Group

(57) ABSTRACT

A static electrical device assembly including: a static electrical device; a heat exchanger system including a first heat exchanger adapted for cooling of the static electrical device by transferring heat into ambient air, and a second heat exchanger adapted for recovering heat from the static electrical device; a flow passage adapted to provide a route for air flow between outdoor air and the first heat exchanger; a sensor system adapted to provide temperature information relating to the static electrical device; and a control system (CTRL) adapted to control the heat exchanger system based on information provided by the sensor system. The heat exchanger system further includes a shutter arrangement adapted to adjust a surface area of the flow passage, the control system (CTRL) is adapted to control the shutter arrangement between an open state and an enclosed state.

10 Claims, 2 Drawing Sheets

(51) Int. Cl.
*F28F 27/02* (2006.01)
*H01F 27/40* (2006.01)

(58) Field of Classification Search
USPC .......................................................... 361/689
See application file for complete search history.

(56) References Cited

U.S. PATENT DOCUMENTS

| | | | | |
|---|---|---|---|---|
| 6,359,779 | B1 * | 3/2002 | Frank, Jr. | G06F 1/20 361/679.33 |
| 6,456,179 | B1 * | 9/2002 | Backa | H01F 27/02 336/57 |
| 7,152,418 | B2 * | 12/2006 | Alappat | H05K 7/20563 62/186 |
| 7,214,131 | B2 * | 5/2007 | Malone | F24F 11/0001 361/695 |
| 7,813,121 | B2 * | 10/2010 | Bisson | H05K 7/20736 361/679.53 |
| 8,260,472 | B2 * | 9/2012 | Hoffman | H01F 27/085 702/182 |
| 8,649,173 | B2 * | 2/2014 | Kimura | H05K 7/20727 361/679.48 |
| 9,261,926 | B2 * | 2/2016 | Larsen | H05K 7/20009 |
| 10,992,114 | B2 * | 4/2021 | McManus | H05K 7/20572 |
| 2002/0050530 | A1 * | 5/2002 | Stefano | B60H 1/00857 454/258 |
| 2003/0056772 | A1 | 3/2003 | Borrmann et al. | |
| 2003/0140638 | A1 | 7/2003 | Arshansky et al. | |
| 2009/0315657 | A1 | 12/2009 | Hoffman et al. | |
| 2010/0330894 | A1 * | 12/2010 | Alexander | B60H 1/241 454/162 |
| 2013/0252538 | A1 * | 9/2013 | Huber | B60K 11/085 454/333 |
| 2015/0003008 | A1 * | 1/2015 | Larsen | H05K 7/20009 361/679.46 |

FOREIGN PATENT DOCUMENTS

| | | | | | |
|---|---|---|---|---|---|
| DE | 3221848 | A1 | | 10/1983 | |
| DE | 3221848 | C | * | 10/1989 | H01F 27/08 |
| GB | 2073498 | A | | 10/1981 | |
| WO | WO2017/089580 | A1 | | 6/2017 | |

OTHER PUBLICATIONS

Extended European Search Report, European Patent Application No. 18248066.5, mailed Jun. 24, 2019, 7 pages.

International Search Report and Written Opinion of the International Searching Authority, PCT/EP2019/082212, mailed Jan. 31, 2020, 12 pages.

Written Opinion of the International Preliminary Examining Authority, PCT/EP2019/082212, mailed Oct. 27, 2020, 4 pages.

International Preliminary Report on Patentability of the International Preliminary Examining Authority, PCT/EP2019/082212, mailed Mar. 30, 2021, 14 pages.

"Transformers as District Heating Boilers," Modern Power Systems, Feb. 19, 2016 (originally published in MPS Jan. 2016), http://www.modernpowersystems.com/features/featuretransformers-as-district-heating-boilers-4816181/featuretransformers-as-district-heating-boilers-4816181-475022.html, 3 pages.

Ristamäki, H., "Utilizing Thermal Loss Energy from Transformers Using Heat Pump Technology," Tampere University of Technology, Master's Degree Programme in Electrical Engineering, Master of Science Thesis, Aug. 2012, 95 pages.

Communication Under Rule 71(3) EPC, European Patent Application No. 18248066.5, mailed Jun. 16, 2021, 33 pages.

Office Action, Chinese Patent Application No. 2019800841484.5, mailed Aug. 26, 2023, 7 pages.

* cited by examiner

STATIC ELECTRICAL DEVICE ASSEMBLY COMPRISING HEAT EXCHANGER SYSTEM

CROSS REFERENCE TO RELATED APPLICATIONS

This application is a 35 U.S.C. § 371 national stage application of PCT International Application No. PCT/EP2019/082212 filed on Nov. 22, 2019, which in turns claims foreign priority to European Patent Application No. 18248066.5, filed on Dec. 27, 2018, the disclosures and content of which are incorporated by reference herein in their entirety.

FIELD OF THE INVENTION

The invention relates to a static electrical device assembly comprising a static electrical device, a first heat exchanger adapted to cool the static electrical device, and a second heat exchanger adapted to recover heat from the static electrical device for utilization. Herein a static electrical device comprises a transformer or an inductor.

It is known in the art to adjust cooling of the static electrical device by providing the static electrical device assembly with an adjustable cooling pump adapted to transfer coolant between the static electrical device and the first heat exchanger, and/or an adjustable cooling fan adapted to provide an air flow between outdoor air and the first heat exchanger.

One of the disadvantages associated with the above static electrical device assembly is that the adjustable cooling pump and/or the adjustable cooling fan make the static electrical device assembly a complex and expensive assembly, and the cooling pump and/or the cooling fan increase energy consumption of the static electrical device assembly.

BRIEF DESCRIPTION OF THE INVENTION

An object of the present invention is to provide a static electrical device assembly so as to alleviate the above disadvantages. The objects of the invention are achieved by a static electrical device assembly which is characterized by what is stated in the independent claim. The preferred embodiments of the invention are disclosed in the dependent claims.

The invention is based on the idea of providing the static electrical device assembly with an adjustable shutter arrangement adapted to regulate an air flow between outdoor air and the first heat exchanger.

An advantage of the static electrical device assembly of the invention is that cooling power of the first heat exchanger has a wide adjustment range, and neither a high air flow state nor a low air flow state of the shutter arrangement requires energy for operation. The static electrical device assembly of the invention is simple and inexpensive. It is possible to convert an existing static electrical device assembly into a static electrical device assembly according to present invention by retrofitting a shutter arrangement and other necessary components.

In an embodiment, a control system of the static electrical device assembly is adapted to keep temperature of the static electrical device within a narrow temperature range by controlling the shutter arrangement.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
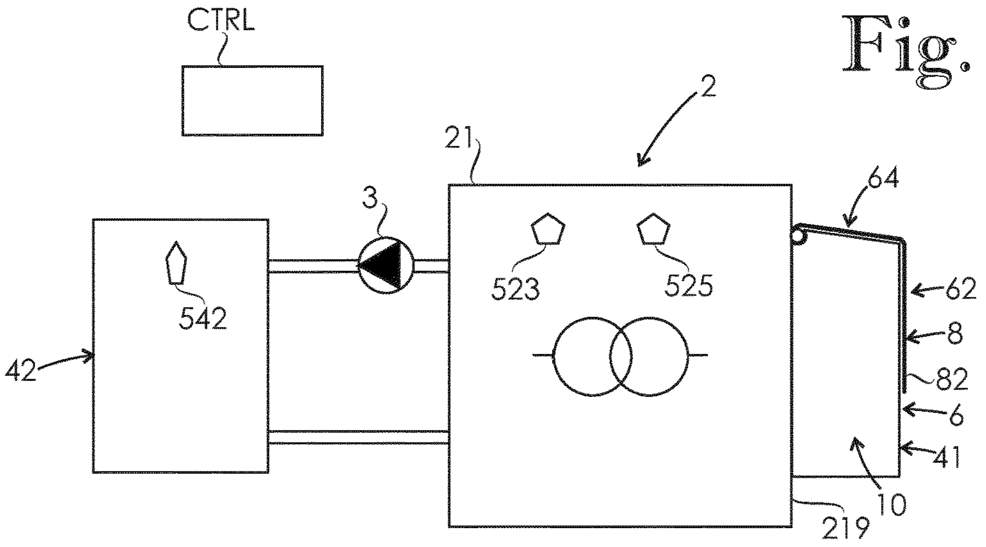
FIG. 1 shows a static electrical device assembly according to an embodiment of the invention, a shutter arrangement of the static electrical device assembly being in an intermediate state between an open state and an enclosed state of the shutter arrangement.

FIG. 1 shows a static electrical device assembly comprising a static electrical device 2, a heat exchanger system, a flow passage 6 for ambient air connection, a sensor system adapted to provide information relating to the static electrical device 2 and the heat exchanger system, and a control system CTRL adapted to control the heat exchanger system based on information provided by the sensor system. The static electrical device assembly is a fixed assembly that is situated on fixed location. The heat exchanger system comprises a first heat exchanger 41, a second heat exchanger 42, a shutter arrangement 8 and a heat recovering pump 3.

The static electrical device 2 of FIG. 1 is a three-phase transformer. In alternative embodiments the static electrical device is a single-phase or a polyphase device. In an embodiment, the static electrical device comprises an inductor. In a general case, a static electrical device assembly according to present invention comprises a winding system having at least one winding.

The static electrical device 2 comprises a housing 21 and a winding system having a primary winding and a secondary winding. The static electrical device 2 is adapted to transfer electrical energy between the primary winding and the secondary winding. The winding system is located inside a coolant space of the housing 21, the coolant space containing coolant, which is in heat conductive connection with the winding system. The coolant comprises oil. In another embodiment the coolant comprises other electrically non-conductive liquid such as ester.

The heat exchanger system is adapted to remove heat from the coolant, and thereby to cool the winding system. The first heat exchanger 41 is adapted for cooling of the coolant by transferring heat into ambient air. The first heat exchanger 41 is a liquid-to-air heat exchanger. The second heat exchanger 42 is adapted to recover heat from the coolant for utilization. The second heat exchanger 42 is a liquid-to-liquid heat exchanger. In an alternative embodiment, the second heat exchanger is a liquid-to-air heat exchanger. Both the first heat exchanger 41 and the second heat exchanger 42 are in fluid connection with the coolant space of the housing 21.

Figure 2:
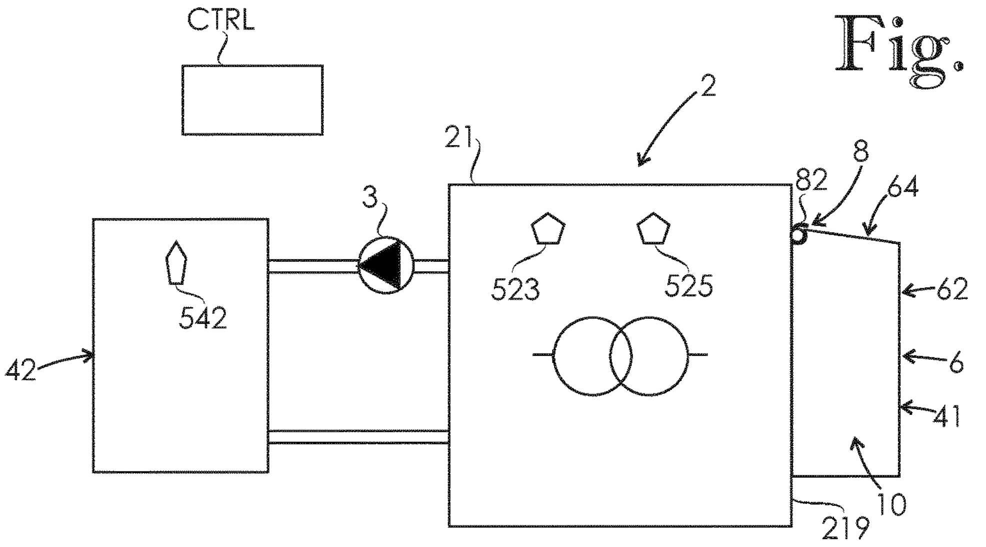
FIG. 2 shows the static electrical device assembly of FIG. 1 with the shutter arrangement in the open state.
Figure 3:
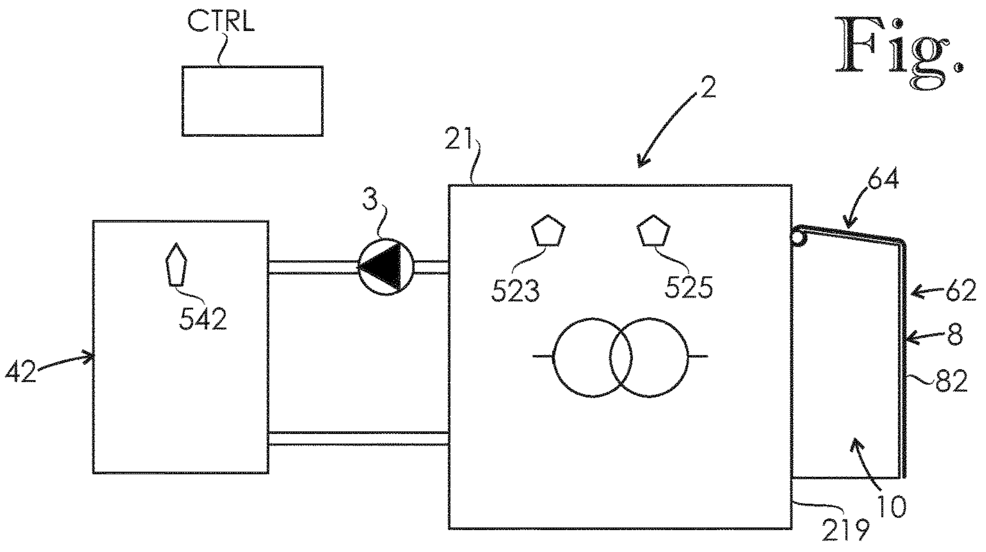
FIG. 3 shows the static electrical device assembly of FIG. 1 with the shutter arrangement in the enclosed state.

The flow passage 6 is adapted to provide a route for air flow between outdoor air and the first heat exchanger 41. The shutter arrangement 8 is adapted to adjust a surface area of the flow passage 6 in order to regulate an air flow between outdoor air and the first heat exchanger 41. The control system CTRL is adapted to control the shutter arrangement 8 between an open state shown in FIG. 2 and an enclosed state shown in FIG. 3 by controlling an electric motor of the shutter arrangement 8.

In the enclosed state a surface area of the flow passage 6 is smaller than in the open state. In other words, in the enclosed state the shutter arrangement 8 covers a greater portion of the first heat exchanger 41 than in the open state. The open state provides more cooling power than the enclosed state.

The air flow in the flow passage 6 is adapted to take place exclusively by means of natural convection. Further, a coolant flow between the coolant space of the housing 21 and the first heat exchanger 41 is adapted to take place exclusively by means of natural convection. In an alternative embodiment, the static electrical device assembly comprises a low-power fan adapted to boost air flow in the flow passage, and a low-power pump adapted to boost coolant flow between the coolant space of the housing and the first heat exchanger.

The flow passage 6 comprises a side section 62 and an overhead section 64. The side section 62 is located on one side of the first heat exchanger 41 such that the first heat exchanger 41 is located between the side section 62 and the housing 21 in a horizontal direction. The side section 62 is adapted to provide a route for a horizontal air flow between outdoor air and the first heat exchanger 41. The overhead section 64 is located directly above the first heat exchanger 41, and is adapted to provide a route for a vertical air flow between the first heat exchanger 41 and outdoor air.

A surface area of the overhead section 64 is equal to a surface area of the first heat exchanger 41 defined on a horizontal plane such that in the open state of the shutter arrangement 8 projections of the shutter arrangement 8 and the first heat exchanger 41 on a horizontal plane do not overlap. In other words, the shutter arrangement 8 allows, in the open state thereof, a completely unobstructed air flow upwards from the first heat exchanger 41 to outdoor air. In an alternative embodiment, a surface area of the overhead section defined on a horizontal plane is at least 75% of a surface area of the first heat exchanger defined on a horizontal plane.

In the enclosed state of the shutter arrangement 8 the first heat exchanger 41 is substantially isolated from outdoor air such that there is substantially no route for an air flow between outdoor air and the first heat exchanger 41. This means that in the enclosed state of the shutter arrangement 8 there is no intentional route for air flow between outdoor air and the first heat exchanger 41 but all such routes, if any, result from manufacturing tolerances and roughness of materials.

In an alternative embodiment, a surface area of the flow passage corresponding to the enclosed state is at least 90% smaller than a surface area of the flow passage corresponding to the open state. In another alternative embodiment, a surface area of the flow passage corresponding to the enclosed state is at least 75% smaller than a surface area of the flow passage corresponding to the open state. In a further alternative embodiment, a surface area of the flow passage corresponding to the enclosed state is at least 50% smaller than a surface area of the flow passage corresponding to the open state. Basically it is easier to achieve high percentage in new assemblies than in retrofitted assemblies.

The static electrical device assembly further comprises a restricting wall arrangement 10 adapted to restrict air flow between outdoor air and the first heat exchanger 41. The restricting wall arrangement 10 comprises a first side wall, a second side wall and a bottom wall. The first side wall and the second side wall are vertical and parallel walls spaced apart from each other. The first heat exchanger 41 is located between the first side wall and the second side wall. The bottom wall is a horizontal wall connecting the first side wall and the second side wall. The bottom wall is located below the first heat exchanger 41.

The first side wall, the second side wall and the bottom wall are located close to the first heat exchanger 41. Distance between the first heat exchanger 41 and each of the first side wall, the second side wall and the bottom wall is less than 0.5 m. In an alternative embodiment distance between the first heat exchanger and each of the first side wall and the second side wall is less than 1.0 m.

Each of the first side wall, the second side wall and the bottom wall is made of material capable of blocking both air flow and thermal radiation. In an alternative embodiment, the restricting wall arrangement 10 comprises thermal insulation material.

The shutter arrangement 8 has a plurality of intermediate states between the open state and the enclosed state thereof. In FIG. 1 the shutter arrangement 8 is in an intermediate state. The shutter arrangement 8 comprises a single roller shutter 82 made of material capable of blocking both air flow and thermal radiation. In an alternative embodiment, the shutter arrangement comprises thermal insulation material.

Figure 4:
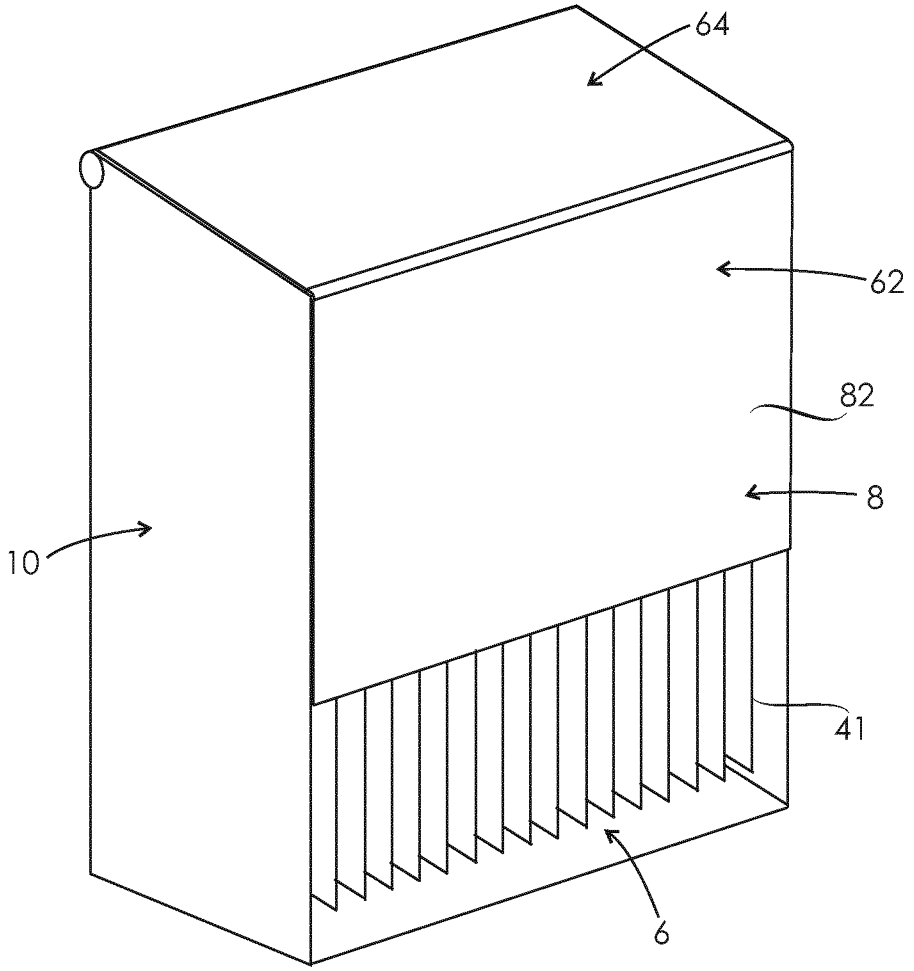
FIG. 4 shows an axonometric projection of a portion of the static electrical device assembly of FIG. 1.

FIG. 4 shows that a width of the roller shutter 82 is equal to the distance between the first side wall and the second side wall. In the enclosed state of the shutter arrangement 8 there is no intentional route for air flow between side edges of the roller shutter 82 and the first side wall and the second side wall.

A shaft around which the roller shutter 82 is wound in the open state of the shutter arrangement 8 is a horizontal shaft located above the first heat exchanger 41, and spaced apart from the first heat exchanger 41 in horizontal direction. When transferring from the enclosed state towards the open state of the shutter arrangement 8, the side section 62 is uncovered first and the overhead section 64 of the flow passage 6 is uncovered subsequently.

In alternative embodiments, the shutter arrangement comprises at least one shutter element comprising at least one roller shutter and/or at least one jalousie. In an embodiment, the first side wall and the second side wall of the static electrical device assembly of FIG. 1 are replaced with respective shutter elements.

In the enclosed state of the shutter arrangement 8, distance between the first heat exchanger 41 and the roller shutter 82 is less than 0.5 m. In an alternative embodiment distance between the first heat exchanger and the shutter arrangement is less than 1.0 m when the shutter arrangement is in the enclosed state of thereof.

The shutter arrangement 8 is adapted to cooperate with the first side wall, the second side wall, the bottom wall and an end wall 219 of the housing 21 in order to provide the enclosed state of the shutter arrangement 8 in which the first heat exchanger 41 is substantially isolated from outdoor air. The first side wall, the second side wall, the bottom wall and the end wall 219 of the housing 21 are fixed walls, and only the shutter arrangement 8 is adapted to adjust cooling power of the first heat exchanger 41.

In alternative embodiments, there are fewer fixed walls than in the embodiment shown in FIGS. 1 to 4. In an embodiment, the bottom wall is omitted.

The flow passage 6 is defined by the shutter arrangement 8, the restricting wall arrangement 10 and the end wall 219 of the housing 21. In an alternative embodiment the flow passage is defined by the shutter arrangement and the restricting wall arrangement, wherein the restricting wall arrangement comprises a back wall which is a fixed vertical wall connecting the first side wall and the second side wall, and located between the first heat exchanger and the static electrical device.

In a general case, cooling power of the first heat exchanger corresponding to the enclosed state is at least 50% lower than cooling power of the first heat exchanger corresponding to the open state. Depending on embodiment, such a decrease in cooling power can be achieved by relatively small change in the surface area of the flow passage.

In an embodiment, the first heat exchanger comprises a heat exchanger stack having a plurality of substantially planar heat exchanger elements stacked adjacent each other such that planes defined by the heat exchanger elements are vertical. In said embodiment, it is possible to greatly reduce the cooling power of the first heat exchanger simply by reducing air flow between the heat exchanger elements. Said reducing can be achieved with jalousies provided between the heat exchanger elements. It should also be noted that in order to reduce a vertical air flow between the heat exchanger elements, it is basically sufficient to provide one jalousie above or below the heat exchanger stack. Similarly, in order to reduce a horizontal air flow between the heat exchanger elements, it is basically sufficient to provide one jalousie at one side of the heat exchanger stack.

The sensor system comprises temperature sensors adapted to provide information relating to temperature of the static electrical device 2, and a heat requirement sensor 542 adapted to provide information relating to heat requirement of the second heat exchanger 42. The temperature sensors comprise a winding temperature sensor 523 adapted to provide information relating to temperature of the winding system, and a coolant temperature sensor 525 adapted to provide information relating to temperature of the coolant.

The heat recovering pump 3 is adapted to transfer coolant between the coolant space and the second heat exchanger 42. The control system CTRL is adapted to control the heat recovering pump 3 and the shutter arrangement 8 based on information provided by the sensor system. The control system CTRL is adapted to increase cooling of the static electrical device 2 by controlling the shutter arrangement 8 towards the open state, and by increasing rotation speed of the heat recovering pump 3. The control system CTRL is adapted to decrease cooling of the static electrical device 2 by controlling the shutter arrangement 8 towards the enclosed state, and by reducing rotation speed of the heat recovering pump 3.

In an embodiment the heat recovering pump is omitted. In said embodiment, the control system is adapted to increase cooling of the static electrical device by controlling the shutter arrangement towards the open state. The control system is adapted to decrease cooling of the static electrical device by controlling the shutter arrangement towards the enclosed state.

The hotter the coolant, the more heat the second heat exchanger 42 can recover. In situations where the second heat exchanger 42 requires heat, and the heat recovering pump 3 is running, the control system CTRL is adapted to keep the shutter arrangement 8 in the enclosed state, unless temperature of the static electrical device 2 rises higher than allowed by prevailing operating state.

In an embodiment, the second heat exchanger is located inside a building, and heat recovered by the second heat exchanger is utilized for heating of the building. In an alternative embodiment, heat recovered by the second heat exchanger is utilized for producing hot water.

The control system CTRL has an isothermic operating state in which the control system CTRL is adapted to keep temperature of the static electrical device 2 within a favourable temperature range, wherein information relating to the temperature of the static electrical device 2 is provided by at least one of the temperature sensors. The favourable temperature range is a narrow temperature range which is remote from the maximum allowable temperature of the static electrical device 2. In an embodiment, width of the favourable temperature range is 10° C. In another embodiment width of the favourable temperature range is less than or equal to 20° C.

The isothermic operating state of the control system CTRL reduces need for maintenance. Temperature variation of the static electrical device 2 sucks moisture from ambient air, and therefore reducing the temperature variation reduces need to replace desiccation material of the static electrical device 2.

The control system CTRL further has a heat recovery operating state in which the control system CTRL is adapted to optimize heat recovery by the second heat exchanger 42. In the heat recovery operating state the control system CTRL is adapted to keep temperature of the static electrical device 2 within a heat recovery temperature range which is wider than the favourable temperature range.

Operating state of the control system CTRL is adapted to be selected by operating personnel of the static electrical device assembly. In an alternative embodiment, the control system is adapted to select operating state thereof automatically based on at least one predetermined condition.

In an embodiment the heat recovery temperature range only has an upper limit, which is less than or equal to the maximum allowable temperature of the static electrical device. In an alternative embodiment, the heat recovery temperature range also has a lower limit which is selected to ensure that the coolant remains in liquid state.

In an embodiment, the static electrical device assembly comprises a heat pump, which is adapted to use the second heat exchanger as a source of heat. In this embodiment, the control system has a heat recovery operating state in which the control system is adapted to maximise operating efficiency of the heat pump.

It will be obvious to a person skilled in the art that the inventive concept can be implemented in various ways. The invention and its embodiments are not limited to the examples described above but may vary within the scope of the claims.

The invention claimed is:

1. A static electrical device assembly comprising:

a static electrical device comprising a housing and a winding system having at least one winding, the winding system being located inside a coolant space of the housing, the coolant space containing coolant which is in heat conductive connection with the winding system;

a heat exchanger system comprising a first heat exchanger adapted for cooling of the coolant by transferring heat into ambient air, and a second heat exchanger adapted for recovering heat from the coolant, both the first heat exchanger and the second heat exchanger being in fluid connection with the coolant space;

a flow passage for ambient air connection, the flow passage that provides a route for air flow between outdoor air and the first heat exchanger;

a sensor system comprising at least one temperature sensor that provides information relating to temperature of the static electrical device; and a control system (CTRL) that controls the heat exchanger system based on information provided by the sensor system, wherein the control system (CTRL) has an isothermic operating state in which the control system (CTRL) keeps temperature of the static electrical device within a favorable temperature range, the favorable temperature range being substantially narrower than an allowed temperature range of the static electrical device, and the favorable temperature range being remote from upper and lower limits of the allowed temperature range of the static electrical device, wherein the heat exchanger system further comprises a shutter that adjusts a surface area of the flow passage in order to regulate an air flow between outdoor air and the first heat exchanger, the control system (CTRL) that controls the shutter arrangement between an open state and an enclosed state, in the enclosed state cooling power of the first heat exchanger is at least 50% lower than in the open state and wherein the heat exchanger system comprises a heat recovering pump that transfers coolant between the coolant space and the second heat exchanger, wherein the control system (CTRL) controls the heat recovering pump and the shutter arrangement based on information provided by the sensor system, and wherein the flow passage comprises a side section that provides a route for a horizontal air flow between outdoor air and the first heat exchanger.

2. A static electrical device assembly according to claim 1, wherein the flow passage comprises an overhead section located directly above the first heat exchanger, the overhead section providing a route for a vertical air flow between the first heat exchanger and outdoor air, a surface area of the overhead section being at least 50% of a surface area of the first heat exchanger defined on a horizontal plane.

3. A static electrical device assembly according to claim 1, wherein the static electrical device assembly further comprises at least one fixed wall, and the flow passage is defined by the shutter arrangement and the at least one fixed wall.

4. A static electrical device assembly according to claim 1, wherein a surface area of the flow passage corresponding to the enclosed state is at least 50% smaller than a surface area of the flow passage corresponding to the open state.

5. A static electrical device assembly according to claim 4, wherein in the enclosed state of the shutter arrangement the first heat exchanger is substantially isolated from outdoor air such that there is substantially no route for an air flow between outdoor air and the first heat exchanger.

6. A static electrical device assembly according to claim 1, wherein a coolant flow between the coolant space of the housing and the first heat exchanger takes place exclusively by means of natural convection.

7. A static electrical device assembly according to claim 1, wherein the air flow in the flow passage takes place exclusively by means of natural convection.

8. A static electrical device assembly according to claim 1, wherein the shutter arrangement comprises at least one roller shutter.

9. A static electrical device assembly according to claim 1, wherein the sensor system further comprises at least one heat requirement sensor that provides information relating to heat requirement of the second heat exchanger.

10. A static electrical device assembly according to claim 1, wherein the at least one temperature sensor comprises a winding temperature sensor that provides information relating to temperature of the winding system, and/or a coolant temperature sensor that provides information relating to temperature of the coolant.

* * * * *